2,839,383
METHOD OF PRODUCING REFRACTORY METALS

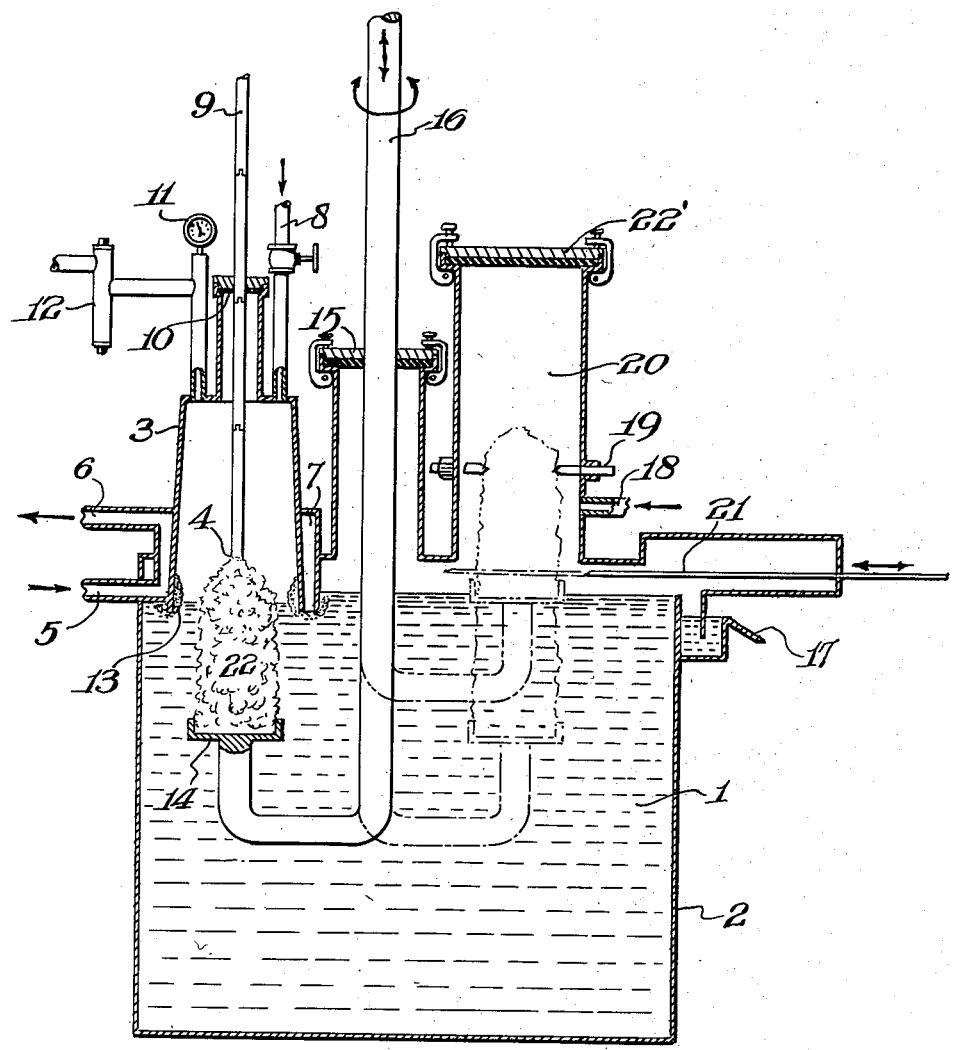

Robert Myers McKinney, Wilmington, Del., assignor to E. I. du Pont de Nemours and Company, Wilmington, Del., a corporation of Delaware Application February 26, 1953, Serial No. 339,069

12 Claims. (Cl. 75—84.5)

This invention pertains to the continuous and semi-continuous production of titanium, zirconium and like metals. More particularly, it pertains to an improved method of removing the product metal from a continuously operated reaction zone.

The refractory metals such as titanium have desirable properties especially when they are substantially free of oxygen, nitrogen and carbon and as a result have good ductility. The oxides of these elements have not been completely reduced to the pure ductile metal. The chlorides, such as $TiCl_4$, however, may be reduced by active metals, such as sodium, calcium and magnesium, to the pure ductile state. Substantially all the titanium now produced is prepared by batch methods in the form of a spongy solid. This form of the product is dictated largely by its high melting point of about 1725° C. and the fact that no refractories are known which will hold molten titanium without contaminating interaction. These factors, in addition to the fact that the product metal adheres strongly to the walls of the reactor near the reaction zone have hampered the development of true continuous operations.

Titanium is now prepared commercially in a batch process in which the reaction vessel is filled with the products consisting chiefly of sponge metal and salt by-product. After the reaction mass is cooled it is milled into chips and leached or vacuum distilled. In some cases, the salt is distilled out of the reaction vessel in the second stage of the batch operation. The batch operations inherently result in time consuming operations at low volume of production relative to the installation costs. It would be very advantageous to provide a continuous means of removing the reaction products from the reaction zone, thus eliminating interruptions and repeated heating and cooling at the reaction site. It is, therefore, an object of this invention to provide a method of continuously removing the refractory metal sponge. A further object is a method for producing a sponge metal product which does not adhere to the sides of the vessel and which is continuously removable from the zone of reaction in an elongated form. A still further object is a method for producing titanium sponge from a halide compound by a reduction operation within a closed container the bottom of which is sealed by a static pool of a molten salt, the reaction taking place within the container and adjacent to said sealing pool. Other objects are to simplify and facilitate the removal and handling of the product metal so as to decrease contamination, and to conserve heat, energy and time.

These and other objects and advantages are attained by this invention which is a method of recovering a Fourth Group refractory metal reaction product produced by metallo-thermic reduction of a non-fluoride halogen compound of said refractory metals in a reaction zone enclosed by an inverted reaction vessel sealed at the bottom by contact with a relatively large pool of molten salt which comprises downwardly withdrawing, supporting and guiding said metal reaction product in elongated form in said sealing salt pool from said reaction zone, preventing adhesion of the metal product to the reactor walls, imparting lateral movement to successive increments of said metal reaction product, raising it out of said molten salt at a point outside said inverted reaction vessel, and separating it from the associated salts and residues. Refractory metals of the Fourth Group specifically include titanium, zirconium and hafnium and the non-fluoride halogen compounds are the chlorides, bromodies and iodides, the chlorides being preferred because of relative cheapness. Metallo-thermic reduction is defined as the reaction at elevated temperature, e. g. above the melting point of the reducing metal, between the refractory metal halide and the reducing metals which are defined as the alkali and alkaline earth metals and include Mg, Ca, Ba, Sr, Na, K, Li, Cs, and Rb.

In a more specific embodiment this invention comprises co-mingling and reaction a halide of a refractory metal of the IV A group of the periodic table such as titanium tetrachloride or zirconium tetrachloride, the halogen component of said halide having an atomic number greater than 9, and a reducing metal selected from the alkali metals and the alkaline earth metals including magnesium in a reaction chamber while preventing the adhesion of the product metal to walls of said chamber, maintaining communication between the reaction zone and the exterior of the reaction chamber for the removal of the product metal through a sealing pool of molten by-product salt, said seal being accomplished by the reaction chamber side walls extending down into the molten salt, withdrawing, supporting and guiding the product metal, in the form of a coherent sponge stick, downwardly from said reaction zone into said salt pool at a velocity less than its average free falling velocity in the molten salt, imparting lateral motion to successive increments of said product metal sponge and subsequently raising it out of the salt pool, separating the product metal from by-products and residues and recovering the purified metal.

There are several ways of preventing undesirable adhesion of the sponge metal to the walls of the reaction chamber. It is understood that slight adhesion is not a serious matter since some force can be applied by the withdrawing mechanism to remove the sponge in a coherent mass. However, when the reaction chamber is made of steel and the reduction reaction is allowed to occur on its surface a strong adhesion apparently due to alloy formation occurs. This is, of course, undesirable and may be prevented by keeping the reaction zone away from the wall. One method is to cool the wall below the reaction temperature by a cooling jacket. Theis temperature is usually below the melting point of the by-product halide salt and hence a protective skin or coating of solid salt is maintained between the wall and the reaction zone and no serious adhesion occurs. Another way is to localize the reaction near the axis of the reactor by directing the feed on one or both of the raw materials. Thus, magnesium may be fed axially in the form of solid rod which builds up a central core of product metal sponge not adhering to the wall. Similarly, molten metal reductants may be directed into the product sponge as it builds at the molten salt surface. A graphite wall section or ring adjacent to the reaction may be used to prevent adhesion. This type of wall surface is preferentially wetted by the molten salt and it apparently behaves much like the solid salt skin permitting the sponge metal to be easily drawn down through it. To facilitate the withdrawal this ring or even the primary reaction chamber may be flared to give conical relief to the sponge.

In a specific adaptation, a cylindrical steel reaction vessel sealed at the bottom by liquid by-product salts and cooled at least to the freezing point of the by-product salt at the wall area adjacent to the salt level, is simultaneously fed with titanium tetrachloride and magnesium, a reaction is maintained centrally at the surface of the molten salt forming a continuing titanium sponge which does not adhere to the walls of the reactor. This sponge is withdrawn downwardly by a suitable mechanism. When a practical length of sponge has been withdrawn into the salt pool, the reaction feed is stopped and the sponge further lowered to clear the bottom of the reatcion chamber, moved laterally and raised out of the salt pool into a chamber containing an atmosphere of argon or other inert gas where free salt drains back into the pool. The product metal is then recovered by known means. Thus, the drained sponge may be moved, in argon, to either a cooling zone where it is rendered cool enough to remove or to a heating zone where its temperature is raised to about 1500° C. or above to vaporize the by-products and consolidate or even melt the metal. The volatile residues may be distilled back to the salt pool. Recovery of the metal from sponge may be obtained by known means.

In another specific adaptation of this invention the titanium sponge is generated by the similar reaction of $TiCl_4$ and Mg in a reactor, said sponge being generated at a constant curvature, either circular or helical. By a suitable submerged mechanism, such as rolls, guides, etc., the sponge is withdrawn along a path of this curvature downwardly and laterally to clear the reactor walls, and then upwardly from the salt pool into a chamber supplied with a protective inert atmosphere to be drained and further processed. This method is particularly well adapted to the back distillation of by-product salts melting, and casting of the metal in a continuous process.

Various other adaptations of this process improvement may be found. Thus, the reaction chamber may be supplied with $TiCl_4$ and fed centrally with a continuing rod of solid magnesium thereby maintaining a reaction zone at the center surface of the molten salt and out of contact with the walls, even though the walls are not cooled.

On another variation the magnesium may be fed centrally in a molten stream thereby building a core of sponge metal out of contact with the apparatus. Due to splashing, etc., it is desirable to cool the reactor walls adjacent to this reaction zone but preferably not enough to entrap substantial amount of the sponge core in the solid salt. The addition of the magnesium or other reducing metal as ingots, lumps or shapes through suitable sealing devices may be practiced as the method is flexible and adaptable to many modifications.

Still another variation comprises adding reducing metal and lower chlorides of the refractory metal such as $TiCl_2$, $TiCl_3$, $TiCl_{2.5}$ and other mixtures centrally to the reaction zone while maintaining an inert gas such as argon or helium above the reaction space. These lower chlorides may be added as solid powders, granules or they may be mixed with by-product salt. Thus, a molten solution of $TiCl_2$, $TiCl_3$ etc. in sodium chloride may be admitted in a stream to the reaction zone. These salt mixtures may also be added in the solid state if desired.

The apparatus is conveniently made of ordinary steel. For better strength at high temperatures in mechanical parts the high temperature alloys or molybdenum or titanium may be used. It is advisable to avoid alloys which are attacked by magnesium. Graphite is a possible material of construction for the reaction vessel proper or a liner since it has been found that the sponge metal product does not adhere strongly to it even though the reaction zone touches the graphite. I prefer, however, to use cooling of the reaction vessel which usually effects the formation of a frozen film or layer of by-product salt which prevents contact between the reactants or the freshly formed sponge and the wall. Unless the graphite is also cooled, there is a slight tendency for carbon contamination.

The salt pool is preferably kept at substantially constant level. To assure continuity of the elongated sponge form the tip or end of the sponge is kept slightly above the salt level by controlling its rate of downward withdrawal. The salt composition may vary. In most cases it will be composed of the halide salts of the reducing metals which are by-products of the reaction. Thus, sodium chloride, magnesium chloride, and calcium chloride and their mixtures are most likely to be used. However, the addition of ancillary salts which are non-contaminating to the metal product may be added for the purpose of lowering the viscosity, raising the boiling point and lowering the freezing point of the bath. Contemplated for this use are the alkali and alkaline earth halides including the fluorides.

The rate of downward withdrawal will also determine to a large extent the density of the metal sponge. The denser the sponge structure the less the proportion of by-product salt retained within its pores especially after the draining. In the early methods of producing sponge, in which no separation during reduction occurred, the metal sponge extended throughout the corresponding amount of by-product salt. In the case of the magnesium reduction of $TiCl_4$ the titanium metal is so tenuously disposed that it occupies only about 11% of the space involved while about 89% is occupied by the associated salt. In the case of sodium reduction only 9% of the total space is occupied by the actual metal. At the temperatures used in practicing this invention such flimsy sponge is not the most desirable. Furthermore, a shrinking or densification of the sponge toward the center and away from the reactor walls is desired. In the operations herein disclosed the sponge does not actually shrink but rather is generated in a more dense form, the density being regulated in the range above the aforementioned minimum density, e. g. 11% for Mg reduction and 9% for sodium reduction. The density is increased by using a slower withdrawal rate which in turn causes more protrusion of the sponge above the liquid salt level, and may be produced practically at values from 25% to 65% or higher. As a result of the greater density less salt is withdrawn from the pool with the metal product and subsequent separation steps are accordingly simplified.

A rather specific adaptation of this invention is illustrated in some detail by reference to the drawing, the essential parts of which are identified in the following tables of references.

1, pool of molten salt ($MgCl_2$).
2, enclosed tank holding molten salt, insulated and provided with heating means (not shown).
3, reaction chamber somewhat conical.
4, reaction zone (approx.).
5, cooling fluid entrance.
6, cooling fluid exit.
7, cooling jacket on portion of reaction chamber.
8, $TiCl_4$ inlet valve.
9, magnesium metal rod.
10, vapor tight seal through which Mg rod is fed.
11, pressure gauge.
12. pressure relief valve set slightly above atmospheric pressure.
13, protective ring of frozen salt.
14, starting plate on which to initiate reaction in zone 4, and to guide sponge. Moved and positioned by rod 16.
15, vapor tight seal to permit movement of rod 16.
16, rod, suspended from mechanism (not shown) for positioning plate 14. It may be internally cooled.
17, overflow maintaining constant level of $MgCl_2$.
18, inlet for argon or other inert gas for purging and equalizing pressure.
19, retractable dogs (several) for holding sponge product in draining position.
20, enclosed draining chamber communicating with a means for removing the product such as a cooling zone and a removal lock, or a melting furnace.
21, position of cutting means for severing major portion of product sponge from plate 14.
22, titanium sponge product.
22', removable cover for draining chamber 20.

Example I

A mild steel apparatus such as that shown in Figure I was used for the reduction of TiCl$_4$ with magnesium metal. The tapered reaction chamber 3 was about 18 inches in diameter at the salt surface and the tank 2 for the molten salt was about 6 ft. deep. To assist in the control of the movement of the product sponge a radioactive source (radioactive cobalt) and a Geiger counter were installed on opposite sides of the reaction chamber a little off center in the water jacket 7 and about three inches above the molten salt level. The activity of the Geiger counter indicated when the product sponge was either in or out of the path of the radiation. By this means the top of the sponge was maintained in an approximately constant position protruding above the salt level. The glands 10 and 15 were made of layers of polyfluoroethylene. The supporting shaft 16 was made hollow and cooled by circulating a high temperature silicone oil in it. This caused a thin layer of salt to form externally and prevented any undesired heat distortion. The experimental apparatus was not equipped with the cutting device 21 and only one batch was made per run. To start the operation the tank 2 was filled with molten anhydrous magnesium chloride. The tank was enclosed in brick and gas heated to maintain a temperature first above the melting point of the salt. The starting plate 14 was then moved into the reaction chamber first above the salt level. Magnesium metal sticks 1¼" in diameter and 3 feet in length were joined by tapped and threaded ends to form a continuing rod which was pushed in through gland 10. Water at 150° C. was circulated in jacket 7 and enough titanium tetrachloride admitted through 8 to purge the chamber and establish a pressure of about 3 p. s. i. gauge which was approximately maintained during the reaction. The reaction was started by striking an electric arc between plate 14 and the lower tip of rod 9 by means of appropriate connections of 9 and 16 to a welding generator. The reaction began readily and as the titanium sponge rose on the plate 14 its presence in the path of the radiation device was noted and the plate 14 was then slowly lowered at a rate which just prevented the rise of the titanium sponge above the radiation path. Magnesium chloride corresponding to the volume of the products formed overflowed at 17. The magnesium rod was fed in at a rate which kept the melting tip just above the titanium sponge. This could be done by probing to feed the sponge and then raising it slightly. The position did not seem too critical and the reaction proceeded quite rapidly. When the shaft 16 had been lowered about 3 feet the magnesium feed was stopped and the sponge lowered swinging over under chamber 20, which had been filled with argon, and raised out of the salt. The whole apparatus was allowed to cool slowly to room temperature. Chamber 20 was opened and the product sponge removed, milled to small lumps and leached with acidified water. The dried, leached lumps were melted in a conventional arc furance to give a high grade titanium metal. By reheating the apparatus the operation could be repeated thus demonstrating that by provision of a cutting means 21, Figure I, the process could become semi-continuous. The sponge taken from the salt pool was quite dense and after draining contained an unusually small amount of salt. The apparent or gross density of the leached sponge lumps ranged from 100 to 165 pounds per cu. ft. The diameter of the titanium metal sponge as it submerged in the salt pool ranged from 8 to 12 inches. With smooth operation it held more constant.

Obviously, various other modifications of the reactor may be employed to carry out this invention which primarily concerns the method of removing the sponge metal from the reaction chamber without recourse to the difficult previous methods which include freezing, chipping, boring, etc. and without contamination due to contact with the apparatus at high temperature particularly in the reaction zone. For example, the position of the sponge in the vicinity of the reaction zone may be observed by means of standard X-ray or gamma radiation equipment as well as by sight glasses suitably placed. In this device a radioactive substance is usually mounted on one side of the reactor and the penetrating rays observed by means of a Geiger counter. The metal sponge is sufficiently absorbent toward these rays that its absence or presence in their path may be detected. By using several Geiger counters or a suitable fluorescent screen the sponge formation can be observed as a silhouette. Alternatively, either the radioactive source or the single counter or both may be moved as a probe for determining the sponge location. The rate of downward withdrawal is preferably slow enough to permit the formation of a relatively dense sponge. This withdrawal rate is preferably such that a mound or column of sponge protrudes upward above the main liquid salt level under the reaction zone. As a result of this protrusion the by-product salt drains out of the sponge pores allowing them to collapse or partially fill with new product metal. The mechanical strength of the sponge can thus be controlled to make it strong enough to handle and hold in position and yet, if desired, to bend or compress for the purposes of transferring or subsequently squeezing out molten salt.

The shape of the reaction zone chamber is preferably cylindrical but may be square, rectangular, etc., and the product sponge may be of other than circular cross-section, e. g. it may be generated as a ribbon.

In Example I the titanium sponge was produced in rather straight elongated segments and removed in a batch, or potentially a semi-continuous method. By providing suitable guide plates and/or rolls in the salt bath the sponge may be generated in curved form which follows the guides and rolls and continuously passes from the reaction chamber downwardly and laterally and then up out of the salt bath into the draining chamber 20, Figure I. This curved path may be in the form of a helix enabling the sponge to continue up through the draining chamber and move again downward, clearing the reaction chamber, and thus into a heating zone where residual salts and magnesium may be vaporized and the metal melted.

By using a reaction chamber of ample dimensions the cooling jacket may be eliminated and the adhesion of the sponge to the reactor wall effectively prevented.

The apparatus arrangement for moving and guiding the sponge is not limited to that illustrated in Figure I. In a simple form of apparatus a single chamber may serve alternately as reactor and draining chamber by suitable purging of the TiCl$_4$ with argon or other inert gas. Thus, the guide plate corresponding to 14 in Figure I may be lowered into the salt as the sponge is formed and at the end of the reaction the TiCl$_4$ or other reactants may be purged from the reaction chamber if desired and the sponge raised into the same chamber for draining. To avoid cooling at this location the supporting plate may be designed to close the chamber and the whole assembly removed to a cooling station while another unit is brought into place over the salt pool to repeat the cycle.

My invention has been discussed with emphasis on the production of titanium metal, but it may also be used in the production of zirconium and hafnium, these being related metals of group IV of the periodic table and having atomic numbers from 22–72 inclusive. The halides of these elements may be added to the reaction zone as described above as fluids and the metal is formed by a metallo-thermic reduction by the active metal reducing agents selected from groups I and II of the periodic table. The reaction may be carried out in the presence of inert gases such as argon and helium as proposed in the prior art and such reagents are effective in dampening the reaction. The extent of use of these gases will depend upon the size of the equipment and the conditions prevailing and the invention is considered independent of the presence or absence of such inert gases.

Several distinct advantages are provided by this invention, perhaps the greatest of which results from the easy and continuous (or semi-continuous) removal of the product from the reaction zone. The reaction chamber does not require dismantling or opening to remove the product. No special force is required to remove the sponge from the reaction zone since provisions are made to prevent adhesion to the apparatus. It is only necessary to support the weight of the product, which is minimized by its immersion in the salt, on the guiding mechanism. Completely continuous operation is possible. Great economy in energy is realized because of the fact that no major cooling step need be applied to the product between the reaction zone and, for example, a final melting operation to produce ingots. In many previous schemes for producing titanium the crude reaction products were cooled and re-heated at least once prior to obtaining the purified product.

I claim as my invention:

1. A method of producing a fourth group refractory metal selected from the group consisting of titanium, zirconium and hafnium by metallo-thermic reduction of a halogen compound selected from the group consisting of a chloride, bromide and iodide of said refractory metal with a reducing metal selected from the group consisting of an alkali and alkaline earth metals in a reaction zone enclosed by an inverted reaction vessel sealed at the bottom by contact with a relatively large pool of molten salt which comprises feeding the reactants to the reaction zone of said vessel while downwardly withdrawing, supporting and guiding the resulting solid metal reaction product in elongated coherent mass form into said sealing salt pool from said reaction vessel, preventing adhesion of the metal product to the reactor walls, maintaining a protective salt coating between said walls and said reaction zone by exteriorly coating said walls, imparting lateral movement within said salt pool to the withdrawn metal reaction product withdrawn from said zone, raising it upwardly and out of said molten salt at a point outside said inverted reaction vessel, and separating the metal product from the associated salt and any residual reactants.

2. A method of producing a fourth group refractory metal selected from the group consisting of titanium, zirconium and hafnium, by metallo-thermic reduction with a reducing metal selected from the group consisting of alkali and alkaline earth metals of a halogen compound of said refractory metal wherein the halogen has an atomic number greater than 9 in a reaction zone enclosed by an inverted reaction vessel sealed at the bottom by contact with a pool of molten salt which comprises continuously adding the halide of the refractory metal and the metal reducing agent in reactive proportions to the reaction zone and continuously and downwardly withdrawing, supporting and guiding the metal reaction product in solid, elongated coherent mass form in said sealing salt pool from said reaction vessel, preventing adhesion of the metal product to the reactor walls by maintaining a solid salt coating between said walls and said reaction zone through exteriorly cooling said walls to a temperature below the melting point of the by-product halide salt formed in the reduction, imparting lateral movement within said pool to the withdrawn metal reaction product withdrawn from said zone, raising it upwardly and out of said molten salt at a point outside said inverted reaction vessel and separating the metal product from the associated salt and any residual reactants.

3. A method of producing titanium metal in sponge form by metallo-thermic reduction of titanium chloride with a reducing metal selected from the group consisting of alkali and alkaline earth metals in a reaction zone enclosed by an inverted reaction vessel sealed at the bottom by contact with a pool of molten salt which comprises continuously adding titanium chloride and the metal reducing agent in reactive proportions to the reaction zone and continuously and downwardly withdrawing, supporting and guiding the metal reaction product in solid, elongated coherent mass form into and through said sealing salt pool from said reaction vessel, preventing adhesion of the metal product to the reactor walls by maintaining a solid salt coating between said walls and said reaction zone through exteriorly cooling said walls to a temperature below the melting point of the by-product chloride salt formed in the reduction, imparting lateral movement within said pool to the withdrawn metal reaction product withdrawn from said zone, raising it upwardly and out of said molten salt at a point outside said inverted reaction vessel and separating the metal product from the associated salt and any residual reactants.

4. A process for the preparation of a refractory fourth group metal selected from the group consisting of titanium, zirconium and hafnium by the interaction of a chloride of said metal and a reducing metal selected from the group consisting of the alkali metals and the alkaline earth metals including magnesium which comprises simultaneously feeding a chloride of the metal and the reducing metal in reactive proportions into the reaction zone of an enclosed inverted vessel the bottom of which is sealed by contact with a molten salt bath, maintaining a protective salt coating on the reactor walls adjacent the reaction zone, withdrawing the refractory metal sponge product in solid, elongated coherent mass sponge form from said vessel by downward movement into said salt bath as formed, imparting lateral movement to the withdrawn product, removing the metal sponge from the bath after said lateral movement by passing it upwardly and out of said bath and separating the thus produced refractory metal from the associated salt and residues.

5. A method for producing titanium metal by metallo-thermic reduction of a halogen compound of said metal wherein the halogen has an atomic number greater than 9 in a reaction zone enclosed by an inverted reaction vessel sealed at the bottom by contact with a pool of a molten salt which comprises simultaneously adding a halide compound of titanium and magnesium as a metal reducing agent in reactive proportions to the reaction zone, downwardly withdrawing, supporting and guiding the metal reaction product in solid, elongated coherent mass form into said sealing salt pool from said reaction vessel, preventing adhesion of the metal product to the reactor walls by maintaining a solid salt coating thereover to separate the said walls and said reaction zone through exteriorly cooling the walls of said zone to a temperature below the melting point of the by-product magnesium halide formed in the reduction, imparting lateral movement to the metal reaction product within said pool on its withdrawal from said reaction vessel, thereafter, raising it upwardly and out of said molten salt at a point outside said inverted reaction vessel, and separating the metal reaction product from the associated salt and any residual reactants.

6. A method for producing zirconium metal by metallo-thermic reduction of a halogen compound of said metal wherein the halogen has an atomic number greater than 9 in a reaction zone enclosed by an inverted reaction vessel sealed at the bottom by contact with a pool of a molten salt which comprises simultaneously adding a halide compound of zirconium and a metal reducing agent selected from the group consisting of alkali and alkaline earth metals in reactive proportions to the reaction zone, downwardly withdrawing, supporting and guiding the metal reaction product in solid, elongated coherent mass form in said sealing salt pool from said reaction vessel, preventing adhesion of the metal product to the reactor walls by maintaining a solid salt coating over said walls to separate the said walls and said reaction zone, providing said coating by exteriorly cooling said walls to below the melting point of the by-product reducing metal halide formed in the process, imparting lateral movement to the metal reaction product within said pool on its withdrawal from said reaction vessel, thereafter, raising it upwardly and out of said molten salt at a point outside said inverted reaction vessel, and separating the metal reaction product from the associated salt and any residual reactants.

7. A method of producing titanium metal in sponge form by metallo-thermic reduction of titanium chloride in a reaction vessel enclosed by an inverted reaction vessel sealed at the bottom by contact with a pool of molten salt which comprises simultaneously adding titanium chloride and magnesium in reactive proportions to the reaction zone while downwardly withdrawing, supporting and guiding the metal reaction product in solid, elongated coherent mass form into and out of said sealing salt pool from said reaction vessel, preventing adhesion of the metal product to the reactor walls by maintaining a solid magnesium chloride salt coating between said walls and said reaction zone and through the external cooling of said walls to a temperature below the melting point of the magnesium chloride by-product salt formed in the process, imparting lateral movement to the metal reaction product within said pool on its withdrawal from said reaction vessel, thereafter, raising it upwardly and out of said molten salt at a point outside said inverted reaction vessel, and separating the metal product from the associated salt and any residual reactants.

8. A method of producing titanium metal in sponge form by metallo-thermic reduction of titanium chloride in a reaction vessel enclosed by an inverted reaction vessel sealed at the bottom by contact with a pool of molten salt which comprises simultaneously adding titanium chloride and sodium in reactive proportions to the reaction zone while downwardly withdrawing, supporting and guiding the metal reaction product in solid, elongated coherent mass form in said sealing salt pool from said reaction vessel, preventing adhesion of the metal product to the reactor walls by maintaining a solid salt coating on said walls to separate the said walls and said reaction zone and through the external cooling of said walls to a temperature below the sodium chloride by-product salt formed in the process, imparting lateral movement to the metal reaction product within said pool on its withdrawal from said reaction vessel, thereafter, raising it upwardly and out of said molten salt at a point outside said inverted reaction vessel, and separating the metal product from the associated salt and any residual reactants.

9. A method of producing zirconium metal in sponge form by metallo-thermic reduction of zirconium chloride in a reaction vessel enclosed by an inverted reaction vessel sealed at the bottom by contact with a pool of molten salt which comprises simultaneously adding zirconium chloride and magnesium in reactive proportions to the reaction zone while downwardly withdrawing, supporting and guiding the metal reaction product in solid, elongated coherent mass form in said sealing salt pool from said reaction vessel, preventing adhesion of the metal product to the reactor walls by maintaining a solid salt coating on said walls to separate the said walls and said reaction zone and through the external cooling of said walls to a temperature below the melting point of the magnesium chloride by-product salt formed in the process, imparting lateral movement to the metal reaction product within said pool on its withdrawal from said reaction vessel, thereafter, raising it upwardly and out of said molten salt at a point outside said inverted reaction vessel, and separating the metal product from the associated salt and any residual reactants.

10. A method of producing zirconium metal in sponge form by metallo-thermic reduction of zirconium chloride in a reaction vessel enclosed by an inverted reaction vessel sealed at the bottom by contact with a pool of molten salt which comprises simultaneously adding zirconium chloride and sodium in reactive proportions to the reaction zone while downwardly withdrawing, supporting and guiding the metal reaction product in solid, elongated coherent mass form in said sealing salt pool from said reaction vessel, preventing adhesion of the metal product to the reactor walls by maintaining a solid salt coating on said walls to separate the said walls and said reaction zone through the exterior cooling of said walls to a temperature below the melting point of the sodium chloride by-product formed in the process, imparting lateral movement to the metal reaction product within said pool on its withdrawal from said reaction vessel, thereafter, raising it upwardly and out of said molten salt at a point outside said inverted reaction vessel, and separating the metal product from the associated salt and any residual reactants.

11. A method of producing titanium metal in sponge form by metallo-thermic reduction of titanium chloride in a reaction zone enclosed by an inverted reaction vessel sealed at the bottom by contact with a pool of molten salt which comprises simultaneously adding titanium tetrachloride and magnesium in reactive proportions to the reaction zone while downwardly withdrawing, supporting and guiding the resulting metal reaction product in solid, elongated coherent mass form in said sealing salt pool from said reaction vessel, preventing adhesion of the metal product to the reactor walls by maintaining a frozen salt coating on said walls by externally cooling said walls to a temperature below the melting point of the magnesium chloride by-product formed in the process, imparting lateral improvement to the metal reaction product within said pool on its withdrawal from said reaction vessel, thereafter, raising it upwardly and out of said molten salt at a point outside said inverted reaction vessel, and separating the metal product from the associated salt and any residual reactants.

12. A method of producing titanium metal in sponge form by metallo-thermic reduction of titanium chloride in a reaction zone maintained at an elevated temperature and enclosed by an inverted reaction vessel sealed at the bottom by contact with a pool of molten salt which comprises simultaneously adding titanium tetrachloride and sodium in reactive proportions to the reaction zone while downwardly withdrawing, supporting and guiding the metal reaction product formed in solid, elongated coherent mass form in said sealing salt pool from said reaction vessel, preventing adhesion of the metal product to the reactor walls by maintaining a frozen salt coating on said walls by exteriorly cooling the walls to a temperature below the melting point of the sodium chloride by-product formed in the process, imparting lateral improvement to the metal reaction product within said pool on its withdrawal from said reaction vessel, thereafter, raising it upwardly and out of said molten salt at a point outside said inverted reaction vessel, and separating the metal product from the associated salt and any residual reactants.

References Cited in the file of this patent

UNITED STATES PATENTS

| | | |
|---|---|---|
| 2,564,337 | Maddex | Aug. 14, 1951 |
| 2,586,134 | Winter | Feb. 19, 1952 |
| 2,607,674 | Winter | Aug. 19, 1952 |
| 2,618,550 | Hampel et al. | Nov. 18, 1952 |
| 2,621,121 | Winter | Dec. 9, 1952 |
| 2,647,826 | Jordan | Aug. 4, 1953 |
| 2,734,244 | Herres | Feb. 14, 1956 |
| 2,744,006 | Winter et al. | May 1, 1956 |
| 2,753,254 | Rick | July 3, 1956 |
| 2,763,542 | Winter | Sept. 18, 1956 |